J. W. GAMBLE.
FLUID PROPORTIONING APPARATUS.
APPLICATION FILED APR. 10, 1918.
1,290,538.
Patented Jan. 7, 1919.
3 SHEETS—SHEET 2.
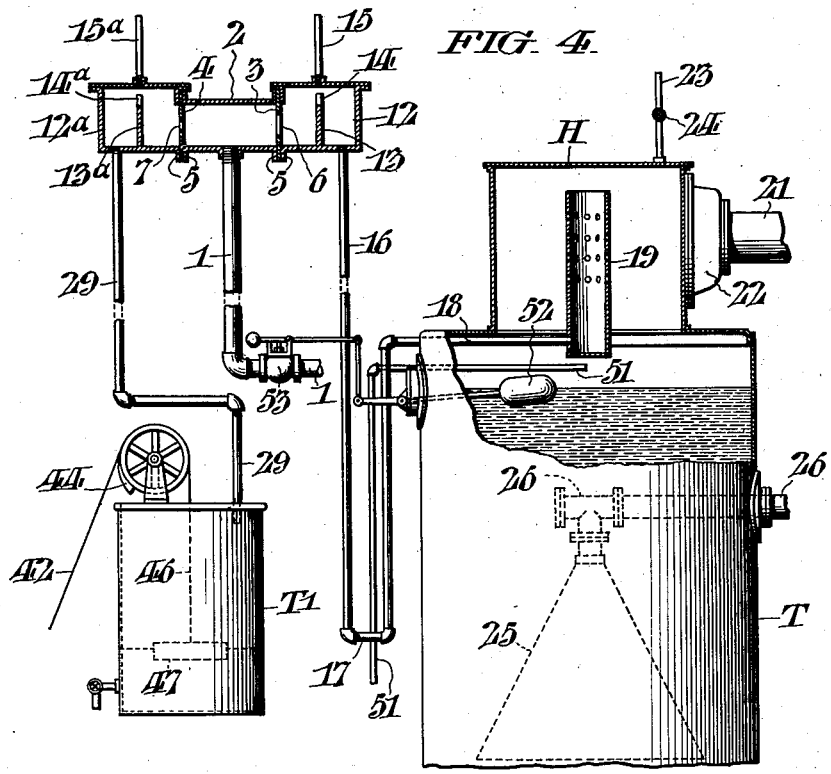
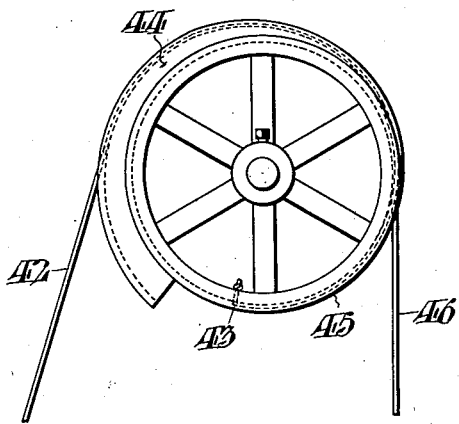
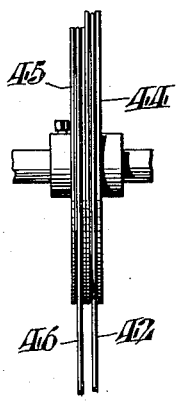
INVENTOR.
Joseph H. Gamble
BY Cornelius D. Ehret
his ATTORNEY.

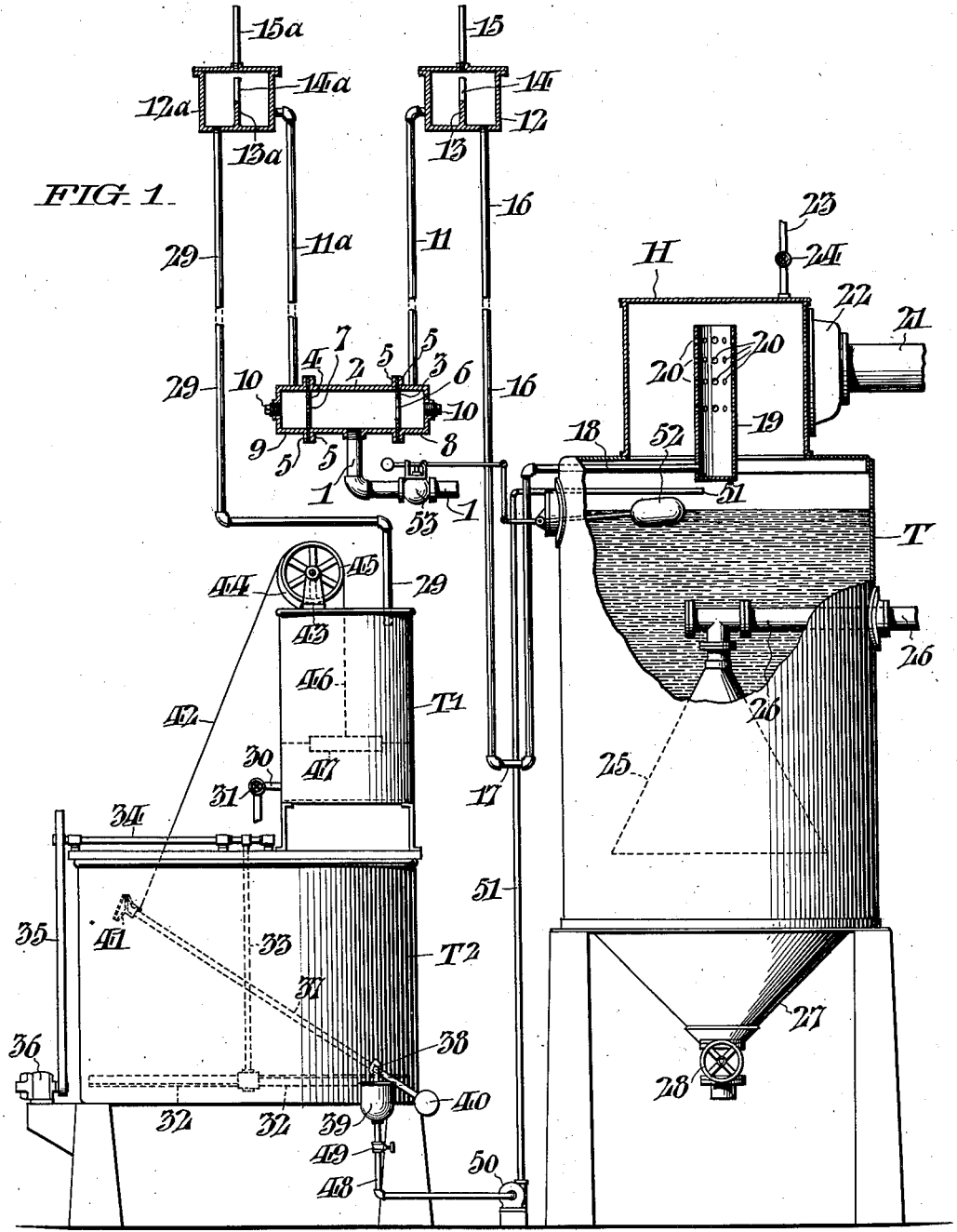

J. W. GAMBLE.
FLUID PROPORTIONING APPARATUS.
APPLICATION FILED APR. 10, 1918.
1,290,538.
Patented Jan. 7, 1919.
3 SHEETS—SHEET 3.
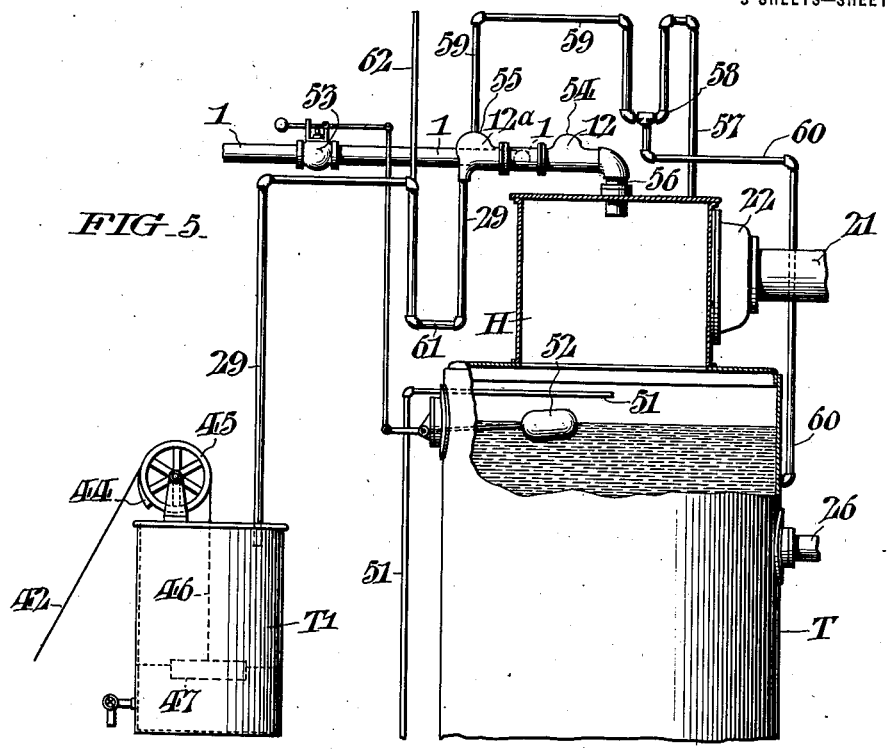
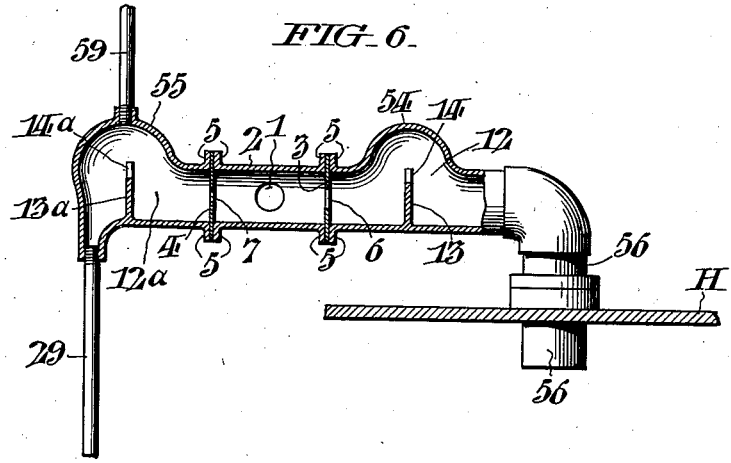
INVENTOR.
Joseph W. Gamble
BY
Cornelius D. Ehret
his ATTORNEY.

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A FIRM COMPOSED OF JOSEPH S. LOVERING WHARTON, WILLIAM S. HALLOWELL, AND JOHN C. JONES.

FLUID-PROPORTIONING APPARATUS.

1,290,538. Specification of Letters Patent. Patented Jan. 7, 1919.

Application filed April 10, 1918. Serial No. 227,636.

*To all whom it may concern:*

Be it known that I, JOSEPH W. GAMBLE, a citizen of the United States, residing in the city and county of Philadelphia, State of Pennsylvania, have invented certain new and useful Improvements in Fluid-Proportioning Apparatus, of which the following is a specification.

My invention relates to a system of or apparatus for automatically proportioning the quantity or rate of flow of one fluid with respect to the quantity or rate of flow of another fluid, as for example, for proportioning a chemical-containing liquid with respect to the quantity or rate of flow of another liquid having content with which the chemical is to react; and more particularly, my invention relates to a system or apparatus of the character referred to for proportioning a chemical-containing liquid with respect to water passed through a heater and constituting the feed water for a steam boiler or the like.

My invention resides in a system or apparatus of the character referred to wherein one of the liquids is delivered into a chamber, as a heater, in which there exists a back pressure, means being provided to prevent such back pressure from affecting or disturbing the proportionality between the liquids.

My invention resides further in a system or apparatus wherein the one liquid, as a chemical containing liquid, is delivered through a conduit, the elevation of whose intake within said liquid is varied with accuracy equally or proportionately to variation in depth of a control liquid, the latter controlling the position of a float, which in turn determines the angular position of a wheel or pulley of a radius varying in such manner that the aforementioned intake shall be varied as to its height equally or proportionately to vertical movement of the float.

My invention resides in apparatus of the character hereinafter described and claimed.

For an illustration of some of the various forms my invention may take, reference is to be had to the accompanying drawing, in which:

Figure 1 is a side elevational view, parts in vertical section, of apparatus embodying my invention.

Fig. 2 is a side elevational view, on enlarged scale, of the wheel or pulley of variable radius shown in Fig. 1.

Fig. 3 is an edge view of the structure shown in Fig. 2.

Fig. 4 is a fragmentary side elevational view, parts in vertical section, of a modified structure embodying my invention.

Fig. 5 is a fragmentary side elevational view, some parts in section, of a further modification.

Fig. 6 is a longitudinal sectional view, on larger scale, some parts in elevation, of part of the structure shown in Fig. 5.

Referring to Fig. 1, 1 is a pipe through which is delivered under pressure one of the liquids, as water, to be employed as the feed water for a steam boiler or for any other purpose. The pipe 1 delivers into the closed chamber 2, whose end walls are formed by the plates 3 and 4 held between the flanges 5, 5 and having, respectively, the orifices or apertures 6 and 7 delivering, respectively, into the end chambers 8 and 9, each provided with a removable plug 10 through which may be introduced any suitable instrument for cleaning the orifices 6 and 7. Communicating with the end chamber 9 is the vertically extending pipe 11 delivering into the box 12, in which is disposed a transversely extending partition or weir 13 having the notch or orifice 14. Communicating with the interior of the box 12 is the vent pipe 15 communicating with the open atmosphere. On the opposite side of the partition 13 from the pipe 11 is the downwardly extending pipe 16, descending to a suitable low level to form a water seal or U-tube 17 whose upwardly returning portion delivers through the pipe 18 into the tube or chamber 19, closed at its bottom and open at its top, and provided with a plurality of holes 20 through which the water delivered thereto sprays outwardly in numerous small jets into the interior of the heater H, to which exhaust steam or other heating fluid is delivered through the pipe 21 and separator 22.

Communicating with the interior of the heater H is the vent pipe 23 controlled by the valve 24.

The heater H discharges into the treating tank T, in which is disposed the conical chamber 25 discharging at its upper end into the pipe 26, which delivers treated water to the boiler feed pumps or to any other device. The tank T may have the conical bottom 27 for collecting precipitated material, which may be drawn off from time to time through the valve 28.

With the end chamber 9 communicates the upwardly extending pipe 11$^a$, delivering into the box 12$^a$ on one side of the partition or weir 13$^a$ having the notch or orifice 14$^a$, the orifices or notches 14 and 14$^a$ being so proportioned with respect to each other that with equal heads of water on the inboard sides of the partitions or weirs 13 and 13$^a$ the quantities of water delivered through notches or orifices 14 and 14$^a$ will bear the same proportion to each other as the quantities of water flowing through the associated orifices 6 and 7.

Communicating with the box 12$^a$ is the vent pipe 15$^a$ open to the atmosphere. Delivering from the box 12$^a$ is the downwardly extending pipe 29, which delivers into the control liquor tank T$^1$, from which the water may be drawn off from time to time through the draw-off pipe 30 controlled by valve 31.

The tank T is placed in suitable relation with respect to the chemical tank T$^2$, in which is a mass of water or liquid containing suitable chemical for reaction with the water delivered into the tank T from the heater H. Within the tank T$^2$ may be disposed the paddles or stirring mechanism 32 rotated by the vertical shaft 33 driven through suitable gearing by shaft 34 driven through belt 35 by motor 36.

Within the tank T$^2$ is disposed the pipe or conduit 37 pivoted at 38 on a pivoting pipe joint extending to the exterior of the tank T$^2$ and delivering into the receptacle 39, the pipe 37 being suitably counterweighted by the mass 40. At its end opposite its pivot the pipe 37 carries a head 41 forming the intake for the pipe 37. To a predetermined point on the pipe 37, preferably at the head 41, is attached a cord or chain 42 which at its other end is attached, as at 43, Figs. 1 and 2, to the wheel or pulley 44 of variable radius, so that the surface upon which the cord 42 wraps may be considered a spiral or cam surface. The wheel 44 is attached to the circular wheel or pulley 45, upon which is wrapped the cord or chain 46 attached at its one end to the wheel 45 and at its other end to the float 47 resting upon the liquid delivered into the tank T$^1$.

The receptacle 39 delivers through the pipe 48, controlled by valve 49, to any suitable liquid forcing means, as a pump 50, which delivers the chemical bearing liquid through the pipe 51 into the tank T and discharges it into the water contained therein. Resting upon the water in the tank T is the float 62 which controls the valve 53 in the pipe 1.

The operation is as follows:

As water is withdrawn from the treating tank T through the pipe 26, the water level is lowered, accompanied by descent of the float 52, which controls the valve 53 controlling influx of water from pipe 1 into the chamber 2. Here the water is divided, a predetermined portion flowing through the large orifice 6 into the end chamber 8 through pipe 11 into the weir box 12 through the notch 14 through the pipe 16, seal 17, into the chamber 19 and thence into the heater H, where it comes into contact with the steam entering through pipe 21 and is raised in temperature and falls into the tank T. Of the water entering the chamber 2 a predetermined proportion, depending upon the relation of the area of the orifice 7 to the area of the orifice 6 passes through orifice 7 to end chamber 9 upwardly through pipe 11$^a$ to the box 12$^a$ through the notch 14$^a$ through pipe 29 into the tank T$^1$.

The venting of the boxes 12 and 12$^a$ prevents air pockets in the system, and the elevation of the box 12 is such that there will always be in the pipe 16 a column of water whose height is sufficient, above the uppermost outlet of the chamber 19, to more than counterbalance the pressure within the heater H, and in addition to have sufficient head to cause flow of water through the pipe 16 at sufficient rate. By providing the seal 17, in the limbs of which there is sufficient height of water to more than balance the back pressure in the heater H, steam is prevented from flowing from pipe 16 into the box 12.

In order that the net head upon the orifices 6 and 7 shall be equal, the pipe 11$^a$ and its associated box 12$^a$ respectively extend to and are disposed at a height corresponding with the vertical extent of pipe 11 and height of box 12, the notches or orifices 14$^a$ and 14 being at equal heights.

There accordingly flows into the tank T$^1$ an amount of water which is directly proportional to the amount delivered through the pipe 18 into the heater H and tank T, and this proportionality is not affected by variations in the back pressure within the heater H, inasmuch as for all variations of pressure within the heater H the net head upon the orifice 6 is always equal to the net head upon the orifice 7.

As water passing through the orifice 7 is delivered into the tank T$^1$, the float 47 rises proportionately, allowing descent of the intake head 41 and passage of liquid into the conduit 37 in equal or proportionate amount due to the variable radius of the cam or spiral wheel 44, the increments of change of radius of this wheel for equal increments of angular movement of the wheel upon its shaft being dependent upon various factors, as for example, the length of the conduit 37 from its pivot to its intake, the inclination of the conduit, the distance of the center of the wheel 44 to right or left of the intake head 41, the distance of the center of the wheel 44 above the intake 41, etc. In general, however, the operation is such that there is discharged into the receptacle 39 and then delivered through the pipe 51 into the treating tank T an amount of chemical bearing liquid which bears a strict proportionality to the amount of water delivered through the pipe 18 into the heater H.

The chemical introduced into the tank T reacts with contents of the heated water, to soften, clarify or otherwise act upon the raw water, the clarified water flowing upwardly through the cone 25 and outwardly through the pipe 26, and precipitate resulting from the chemical reaction collecting in the conical bottom 27, from which it may be drawn off through pipe 28.

In Fig. 4 the appaartus is the same as that illustrated in Fig. 1, with the exception that the orifice plates are themselves located high up, as in the case of the boxes 12 and 12$^a$ of Fig. 1, to take care of back pressure from the heater H, and for other similar purposes.

In this case the plates 3 and 4, having the orifices 6 and 7, form the end walls for the chamber 2 to which water or other liquid is delivered by pipe 1 controlled by the valve 53, which in turn is controlled by the float 52, as in Fig. 1. In this case the water is delivered through the orifices 6 and 7 directly into the boxes 12 and 12$^a$, provided, respectively, with the partitions or weirs 13 and 13$^a$ having the notches or orifices 14 and 14$^a$, the bottoms of the notches 14 and 14$^a$ being disposed sufficiently high that the water on the outboard sides of the orifice plates 3 and 4 when at minimum depth corresponding with the bottom edges of the notches 14 and 14$^a$ will fully cover the orifices 6 and 7. With the boxes 12 and 12$^a$ communicate the air vents 15 and 15$^a$, as in Fig. 1. From the outboard side of the weir or partition 13 water is delivered through pipe 16, seal 17 and pipe 18 to the receptacle 19 within the heater H, as in Fig. 1. And from the outboard side of the partition or weir 13$^a$ water is delivered through pipe 29 into the tank T".

The mode of operation is similar to that described in connection with Fig. 1. The height of the proportioning apparatus comprising the orifice plates 3 and 4 is such that in addition to affording a water head in the pipe 16 sufficient to overcome back pressure within the heater H, there is additional head for producing the necessary flow of water to overcome pipe friction, etc. And the seal 17 is similar in structure and purpose to that described in connection with Fig. 1.

In the modification illustrated in Figs. 5 and 6, pipe 1 delivers water through valve 53 controlled by float 52 into the chamber 2, whose end walls are again formed by the orifice plates 3 and 4 having therein the orifices 6 and 7. These orifices discharge, respectively, into the chambers 12 and 12$^a$, in which are the dams, partitions or weirs 13 and 13$^a$ having the notches 14 and 14$^a$, the chambers 12 and 12$^a$ having the vertical extensions 54 and 55 forming a free space above the members 13 and 13$^a$.

Water passing through the orifice 6 into the chamber 12 flows through the notch 14 and thence through the pipe 56 into the heater H, where it may deliver into trays or in any other suitable well known way to come into contact with steam entering at 21. Simultaneously a proportionate amount of water flows through the orifice 7 into the chamber 12 through the notch 14$^a$ and thence through the pipe 29 to the tank T$^1$, the apparatus otherwise being similar to that described in Fig. 1 for controlling flow of chemical bearing liquid proportionately to the water entering through the orifice 6 into the heater H.

In this case the fluid proportioning device comprising the orifice plates 3 and 4 is disposed at substantially the height of the heater H. The outboard side of the orifice plate 3 being subjected to back pressure within the heater H, a similar pressure is exerted on the outboard side of the orifice plate 4 by means of the pipe 57 communicating with the interior of the heater and communicating through the U-tube air trap 58 with pipe 59, which communicates with the interior of the extension 55 of the chamber 12$^a$. By this structure the pressure within the heater H is communicated to the liquid on the outboard side of the orifice plate 4, whereby the same net head is exerted upon both orifices 6 and 7, whereby the proportionality of the liquids flowing through them is maintained notwithstanding back pressure within the heater H or variations in that back pressure. The air trap 58 prevents steam flowing back from the heater H into the chamber 12$^a$, where the steam would be condensed, and the addition of the condensate to the water flowing through the orifice 7 would affect or disturb the proportionality of the water flowing through pipe 56 into the heater H and that flowing into the control liquid tank T$^1$. To the bottom of the air trap 58 is connected a pipe 60 which delivers any condensate into the tank T below the water level therein. In the pipe 29 connected to the outboard side of the notch 14ª is provided a U-shaped water seal 61 which also serves to more than balance any back pressure likely to occur in the heater H. At the top of the left hand leg of the water seal 61 is a pipe 62 opening to the atmosphere, and so constituting an air vent. With this air vent present siphoning of water from the outboard side of the notch 14ª is prevented, and so prevents irregularity in flow of liquid to the tank T¹. In the absence of the vent 62 such siphoning would also break the water seal in 61 and steam would flow through the pipe 57 and air trap 58 into the chamber 12ª and out through the pipe 29 into the tank T¹.

The mode of operation of the structure described in connection with Fig. 5 is similar to that described in connection with Fig. 1 for proportioning one liquid, as chemical bearing liquid, with respect to another liquid, as water delivered to the heater by pipe 56. By the structure described the fluid proportioning apparatus comprising the orifice plates 3 and 4 may be located approximately at the height or level of the heater H, the flow of steam into the proportioning apparatus being prevented, and the water seal and equality of head upon the orifices being provided by the modified structure described.

What I claim is:

1. Fluid proportioning apparatus comprising a closed chamber, means for conducting fluid thereto, members having orifices through which said fluid flows from said chamber in predetermined proportions, a second closed chamber having therein a medium exerting back pressure, means for conducting fluid delivered through one of said orificed members to said second chamber, and means for insuring the same net head of fluid on each of said orificed members whereby proportionality between the quantities of fluid flowing through said members remains constant notwithstanding back pressure in said second chamber.

2. The combination with a heater, of a treating tank into which said heater discharges, a closed chamber, means for delivering water into said chamber, members having orifices through which water from said chamber is delivered in predetermined proportions, means for conducting water delivered through one of said orifices to said heater, means for insuring the same net head of water on each of said orificed members whereby proportionality between the quantities of water flowing through said members remains constant notwithstanding back pressure in said heater, a source of liquid containing chemical adapted to react with the water delivered by said heater into said tank, and means controlled by water delivered through another of said orificed members controlling delivery of said chemical containing fluid.

3. Liquid proportioning apparatus comprising a closed chamber, means for delivering liquid thereto, members having orifices forming outlets from said chamber, chambers receiving liquid from said first named chamber through said orificed members, means in each of said chambers controlling delivery of quantities of liquid bearing the same proportion to each other as the quantities of liquid delivered through said orificed members, a closed chamber having therein a medium exerting back pressure, means for conducting liquid from one of said chambers to said last named chamber against the back pressure therein, and means for conducting from another of said chambers the liquid bearing a predetermined proportion to the liquid delivered to said last named chamber.

4. Liquid proportioning apparatus comprising a closed chamber, means for conducting liquid thereto, members having orifaces through which liquid is discharged from said chamber, chambers each of which receives liquid from said first named chamber through one of said orificed members, means in each of said chambers controlling delivery of liquid therefrom, a closed chamber having therein a medium exerting back pressure, means for conducting liquid from one of said chambers into said last named chamber, said chambers being disposed at a height such that the liquid delivered from one of them has a head greater than the back pressure in said last named chamber.

5. Liquid proportioning apparatus comprising a closed chamber, means for delivering liquid thereto, members having orifices through which liquid is discharged from said chamber, a closed chamber having therein a medium exerting back pressure, chambers disposed at equal heights above said orificed members and each receiving liquid through one of said orificed members, a liquid connection from one of said chambers to said second named chamber, and means for delivering from another of said chambers the liquid delivered thereto and bearing a predetermined proportion to the liquid delivered to said second named chamber.

6. Liquid proportioning apparatus comprising a closed chamber, means for delivering liquid thereto, members having orifices through which liquid is discharged from said chamber, a closed chamber having therein a medium exerting back pressure, chambers disposed at equal heights above said orificed members and each receiving liquid through one of said orificed members, a liquid connection from one of said chambers to said second named chamber, and means for delivering from another of said chambers the liquid delivered thereto and bearing a predetermined proportion to the liquid delivered to said second named chamber, said elevated chambers being in free communication with the atmosphere.

7. Liquid proportioning apparatus comprising a closed chamber, means for delivering liquid thereto, members having orifices through which liquid is discharged from said chamber, a closed chamber having therein a medium exerting back pressure, chambers disposed at equal heights above said orificed members and each receiving liquid through one of said orificed members, a liquid connection from one of said chambers to said second named chamber, and means for delivering from another of said chambers the liquid delivered thereto and bearing a predetermined proportion to the liquid delivered to said second named chamber, each of said elevated chambers having an apertured member through which the liquid delivered thereto is delivered to the discharge therefrom, said apertures bearing the same proportion to each other as the orifices in said orificed members.

8. Liquid proportioning apparatus comprising a closed chamber, means for delivering liquid thereto, members having orifices through which liquid is discharged from said chamber, a closed chamber having therein a medium exerting back pressure, chambers each of which receives liquid through one of said orificed members, a liquid connection from one of said chambers to said second named chamber, means for delivering from another of said chambers the liquid delivered thereto and bearing a predetermined proportion to the liquid delivered to said second named chamber, and a seal in said liquid connection to said second named chamber disposed at a level below the discharge of said liquid in said second named chamber.

9. Apparatus for controlling liquid delivery comprising a receptacle containing the liquid, means for discharging liquid from said receptacle comprising a liquid intake movable with respect to the level of the liquid in said receptacle, a wheel of varying radius, a connection from said intake to said wheel, and liquid controlled means controlling the angular position of said wheel.

10. Apparatus for controlling liquid delivery comprising a receptacle containing the liquid, means for discharging liquid from said receptacle comprising a liquid intake movable in an arcuate path with respect to the level of the liquid in said receptacle, a wheel of varying radius, a connection from said intake to said wheel, and liquid controlled means controlling the angular position of said wheel.

11. Apparatus for controlling liquid delivery comprising a receptacle containing the liquid, means for discharging liquid from said receptacle comprising a liquid intake movable with respect to the level of the liquid in said receptacle, a wheel of varying radius, a connection from said intake to said wheel, a circular member connected to said wheel, a vertically movable float, and a connection from said float to said circular member.

12. Apparatus for proportioning one liquid with respect to another comprising a receptacle, a float therein, means for delivering to said receptacle liquid proportional to said other liquid, a second receptacle containing said one liquid, a conduit for discharging liquid from said second receptacle, an intake for said conduit movable with respect to the level of liquid in said second receptacle, a wheel of varying radius controlled by said float, and a connection from said wheel to said intake.

13. Apparatus for proportioning one liquid with respect to another comprising a receptacle, a float therein, means for delivering to said receptacle liquid proportional to said other liquid, a second receptacle containing said one liquid, a conduit for discharging liquid from said second receptacle, an intake for said conduit movable in an arcuate path with respect to the level of liquid in said second receptacle, a wheel of varying radius controlled by said float, and a connection from said wheel to said intake.

14. The combination with means for dividing a stream of fluid into portions bearing a predetermined proportion to each other, of a chamber, means for conducting into said chamber one of said portions of fluid, and means for maintaining constant the proportionality between said portions of fluid upon variation of the pressure within said chamber.

15. The combination with a heater, of a treating tank into which said heater discharges, means for dividing a stream of water into portions bearing a predetermined proportion to each other, means for conducting one of said portions of water into said heater, means for maintaining constant the proportionality between said portions of water upon variation of the pressure within said heater, and means for delivering into the water delivered by said heater into said tank chemical adapted to react with contents of said water and proportional in amount to another portion of said water.

16. Liquid proportioning apparatus comprising a chamber, means for conducting liquid thereto, members having orifices through which said liquid flows from said chamber in predetermined proportions, chambers receiving liquid from said first named chamber through said orificed members, a further chamber, means for conducting thereto one of said portions of liquid from one of said chambers, and means for conducting from another of said chambers the liquid bearing a predetermined proportion to the liquid delivered from said one of said chambers.

17. Liquid proportioning apparatus comprising a chamber, means for conducting liquid thereto, members having orifices through which said liquid flows from said chamber in predetermined proportions, chambers receiving liquid from said first named chamber through said orificed members, and disposed above said first named chamber, a further chamber, means for conducting thereto one of said portions of liquid from one of said chambers, and means for conducting from another of said chambers the liquid bearing a predetermined proportion to the liquid delivered from said one of said chambers.

18. Liquid proportioning apparatus comprising a chamber, means for conducting liquid thereto, members having orifices through which said liquid flows from said chamber in predetermined proportions, chambers open to the atmosphere receiving liquid from said first named chamber through said orificed members and disposed above said first named chamber, a further chamber, means for conducting thereto one of said portions of liquid from one of said chambers, and means for conducting from another of said chambers the liquid bearing a predetermined proportion to the liquid delivered from said one of said chambers.

19. In liquid proportioning apparatus, the combination with elevated chambers, of means for delivering thereto streams of liquid bearing a predetermined proportion to each other, a chamber at a level below said chambers, means for conducting to said last named chamber liquid from one of said elevated chambers, and means for conducting from another of said elevated chambers the liquid bearing a predetermined proportion to the liquid delivered from said one of said elevated chambers.

20. Liquid proportioning apparatus comprising means for dividing liquid into streams bearing a predetermined proportion to each other, a chamber, means for conducting one of said portions of liquid to said chamber comprising an ascending and descending conduit, and means for conducting another of said portions of liquid comprising a similar ascending and descending conduit.

21. Liquid proportioning apparatus comprising means for dividing liquid into streams bearing a predetermined proportion to each other, a chamber, means for conducting one of said portions of liquid to said chamber comprising an ascending and descending conduit, and means for conducting another of said portions of liquid comprising a similar ascending and descending conduit, said conduits being in communication with the atmosphere at their highest points.

22. Liquid proportioning apparatus comprising means for dividing liquid into streams bearing a predetermined proportion to each other, a chamber, means for conducting one of said portions of liquid to said chamber comprising a conduit having an initial portion ascending to a point above the point of delivery to said chamber, a descending portion extending to a point below said point of delivery to said chamber, and a third portion ascending to the point of delivery to said chamber, and means for conducting another of said portions of liquid comprising a conduit ascending to the height of the first ascending portion of said first named conduit and thereafter descending.

23. Liquid proportioning apparatus comprising means for dividing liquid into streams bearing a predetermined proportion to each other, a chamber, means for conducting one of said portions of liquid to said chamber comprising a conduit having an initial portion ascending to a point above the point of delivery to said chamber, a descending portion extending to a point below said point of delivery to said chamber, and a third portion ascending to the point of delivery to said chamber, and means for conducting another of said portions of liquid comprising a conduit ascending to the height of the first ascending portion of said first named conduit and thereafter descending, said conduits being in communication with the atmosphere at their highest points.

In testimony whereof I have hereunto affixed my signature this 5th day of April, 1918.

JOSEPH W. GAMBLE.